Dec. 18, 1928.
P. F. DUERR
1,695,324
CORN HUSKER
Filed Feb. 17, 1926 2 Sheets-Sheet 2
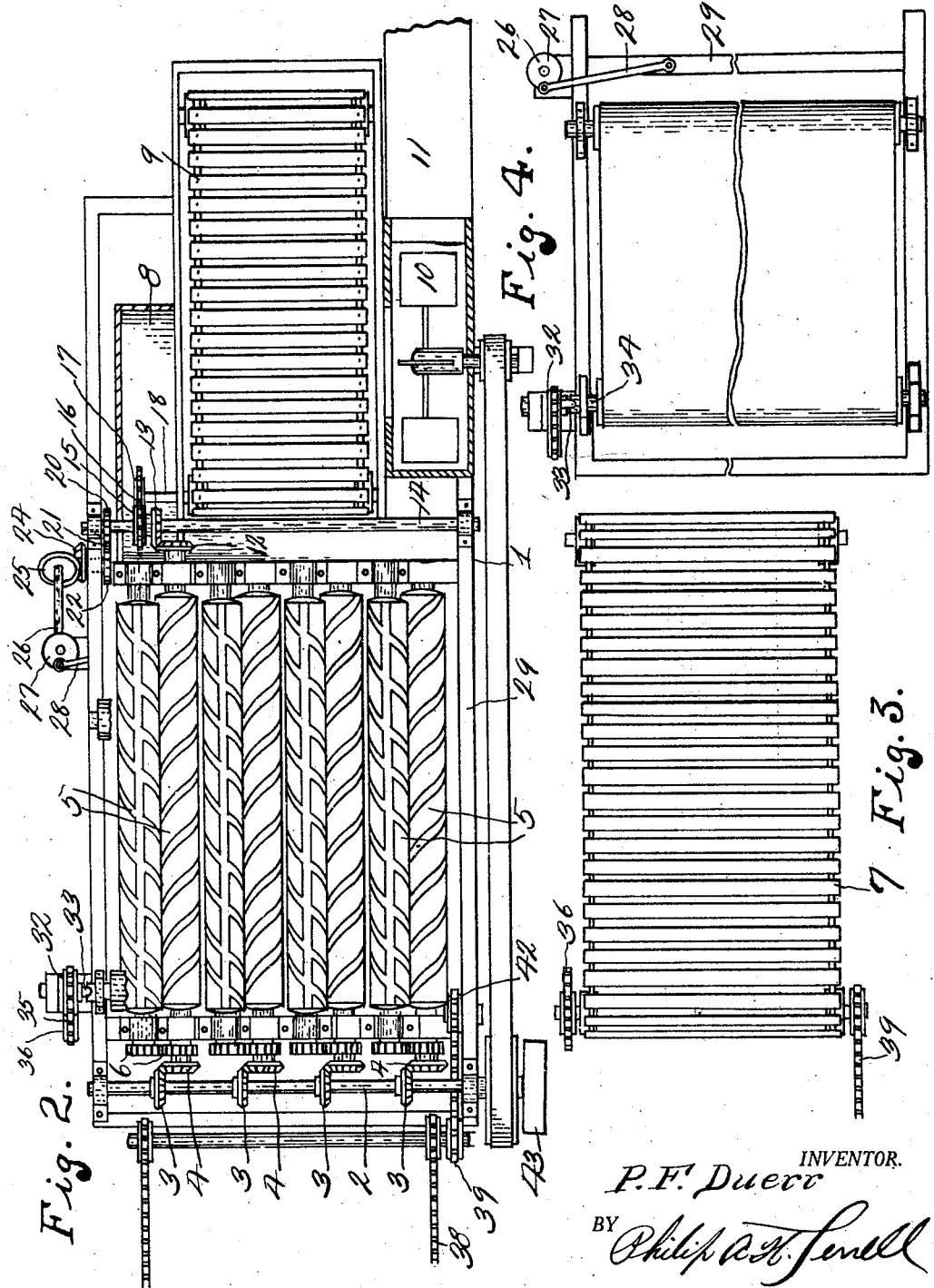
INVENTOR.
P. F. Duerr
BY Philip A. H. Ferrell
ATTORNEY.

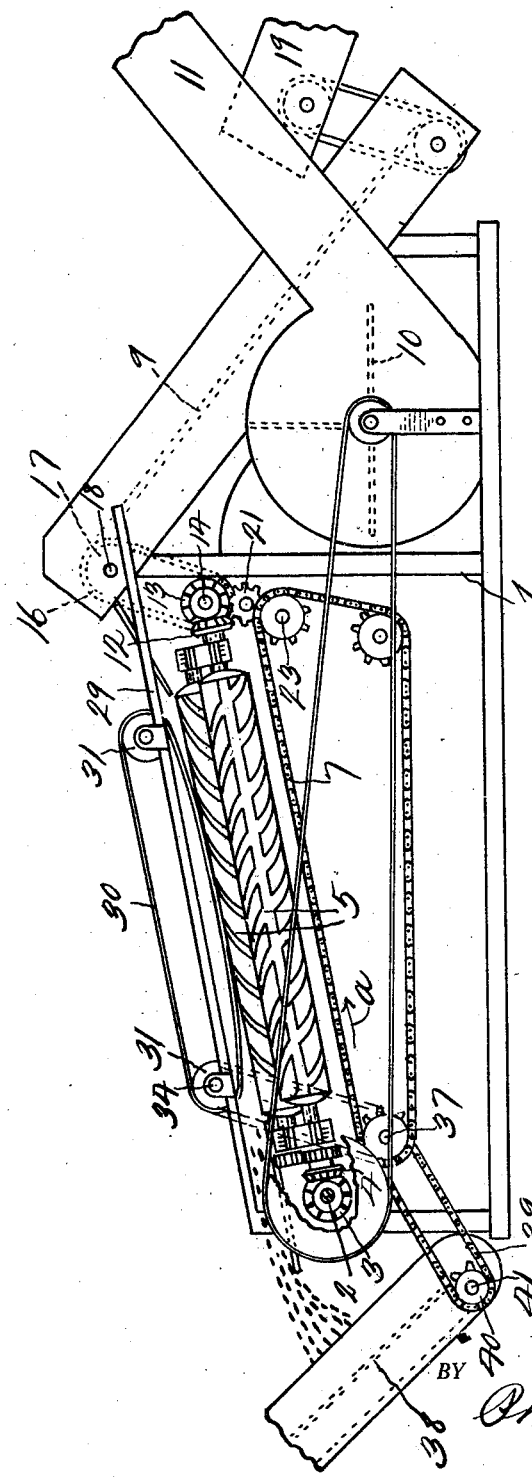

Patented Dec. 18, 1928.

1,695,324

UNITED STATES PATENT OFFICE.

PHILIP F. DUERR, OF SOUTH BEND, NEBRASKA.

CORN HUSKER.

Application filed February 17, 1926. Serial No. 88,825.

The invention relates to corn husking machines and has for its object to provide a machine for husking snapped ears of corn delivered to it while disposed adjacent a corn crib or like container for husked corn, and provided with means whereby the husks may be collected so that the same may be used for feed and also the corn which is shelled during the husking operation from the ear.

A further object is to provide a husking machine comprising a plurality of parallel inclined husking rollers onto which the ears of corn to be husked are discharged by a conveyor, an endless apron mounted on rotatable rollers above the husking rollers for evenly distributing the ears of corn on the rollers, a fan conveyor below and rearwardly of the rollers for collecting the husks after they have been passed through the rollers onto an endless conveyor, which discharges the same adjacent the fan.

A further object is to provide an upwardly and outwardly inclined conveyor, onto which the husked ears of corn are discharged from the rollers, and to provide means whereby all of the movable parts of the machine are operated from a single source of power.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the machine, parts being broken away to better show the structure.

Figure 2 is a plan view of the machine, parts being broken away to better show the structure.

Figure 3 is a plan view of the husk conveyor disposed below the rollers.

Figure 4 is a top plan view of the distributing apron disposed above the husking rollers.

Referring to the drawing, the numeral 1 designates the frame of the machine, which frame adjacent its forward end is provided with a transversely disposed drive shaft 2. Shaft 2 at spaced points is provided with bevelled gears 3, which bevelled gear mesh with bevelled gears 4 carried by the ends of the husking rollers 5, which husking rollers incline upwardly and rearwardly and are provided with gear connections 6, whereby upon rotation of the drive shaft 2, said rollers will rotate inwardly and downwardly in pairs in relation to each other. When ear corn is discharged onto the rollers 5, the husks thereof are gripped and stripped from the ears by the rollers, and is discharged below the rollers onto the endless conveyor 7 which moves in the direction of the arrow a and discharges the husks into the trough 8 beneath the endless conveyor 9, and from which trough the husks are sucked by the fan 10 and are discharged upwardly and rearwardly through the discharge spout 11 which may lead to any suitable source of discharge, therefore it will be seen that the husks are saved as well as any shelled corn which may pass between the rollers.

One of the rollers 5 is provided with a bevelled gear 12 which meshes with a bevelled gear 13, carried by the transversely disposed shaft 14, and which shaft 14 is provided with a sprocket 15 around which a sprocket chain 16 extends, and which sprocket chain extends over a sprocket 17 carried by the transversely disposed shaft 18 of the upper roller of the conveyor 9, therefore it will be seen that the conveyor 9 gets its power from the main drive shaft 2. An additional conveyor 19 may be used if desired for discharging the ears of corn onto the conveyor 9.

Mounted on one end of the transversely disposed shaft 14 is a gear 20, which gear meshes with an idle gear 21, which in turn meshes with a gear 22, which drives the transverse shaft 23 of the endless conveyor 7, and rotates said conveyor 7 in the direction of the arrow a, therefore it will be seen that the conveyor 7 is also rotated from the single drive shaft 2. The outer end of the shaft 23 is provided with a bevelled gear 24 which meshes with a bevelled gear 25 of an upwardly inclined shaft 26, and which shaft has its upper end provided with a disc 27, to which is connected a connecting rod 28, which is connected to a transversely slidable frame 29, which frame supports the endless apron 30 which extends over rollers 31 carried by the frame 29 above the husking rollers 5, and which endless apron 30, in its transverse movement as well as its movement over the rollers 31, evenly distributes the ears of corn to be husked on the rollers and hold the same to the rollers so that the husks thereof will be grasped by the rollers. Apron 30 is rotated by means of a sprocket wheel 32 having a slidable connection 33 with the shaft 34 of one of the rollers 31, and extending over said sprocket 32 is a sprocket chain 35, which extends downwardly and over a sprocket 36 carried by the shaft 37, and which shaft is rotated by the endless conveyor 7.

The hoisting conveyor 38, onto which the ears of corn are discharged after the husking operation is driven by the sprocket chain 39 which extends over the sprocket 40 carried by the shaft 41 and the sprocket 42 carried by the shaft 37, therefore it will be seen that all of the mechanism is driven from a single source of power applied to the operating shaft 2 through the pulley 43.

From the above it will be seen that all of the mechanism is driven from a single source of power, thereby obviating complicated mechanism and assuring a positive operation of the device at all times.

The invention having been set forth what is claimed as new and useful is:—

1. A husking machine comprising a frame, a plurality of inclined husking rollers carried by said frame, a transversely disposed drive shaft, gear connections between adjacent rollers, gear connections between alternate rollers and the drive shaft, an endless apron above the rollers, a second shaft, gear connections between one of the rollers and the second shaft and driving connections between the second shaft and the endless apron.

2. A husking machine comprising a frame, inclined husking rollers carried by said frame, means for rotating said rollers, a transversely disposed shaft, gear connections between one of the rollers and the transversely disposed shaft, an endless apron above the rollers, a transversely movable frame supporting the endless apron, means cooperating with the apron frame and the shaft whereby said apron frame will be transversely reciprocated, a husk conveyor below the rollers and driving connections between the husk conveyor and the apron.

In testimony whereof I affix my signature.

PHILIP F. DUERR.